Feb. 27, 1940. F. E. MAIER 2,191,572
CAR BODY
Filed Oct. 21, 1936 2 Sheets-Sheet 1
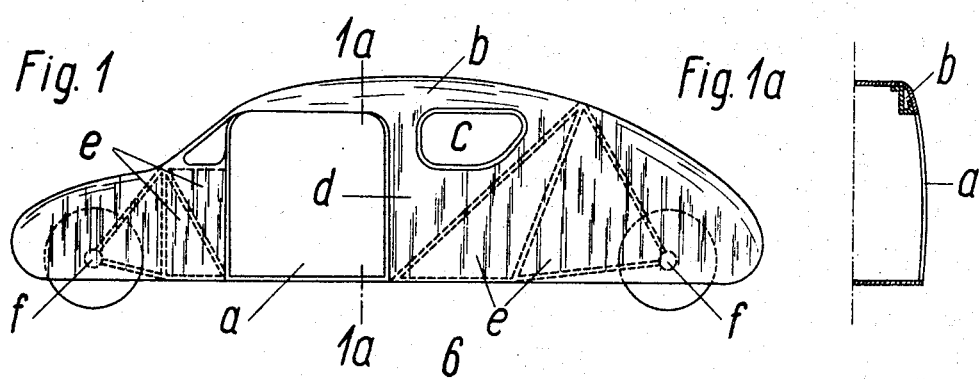
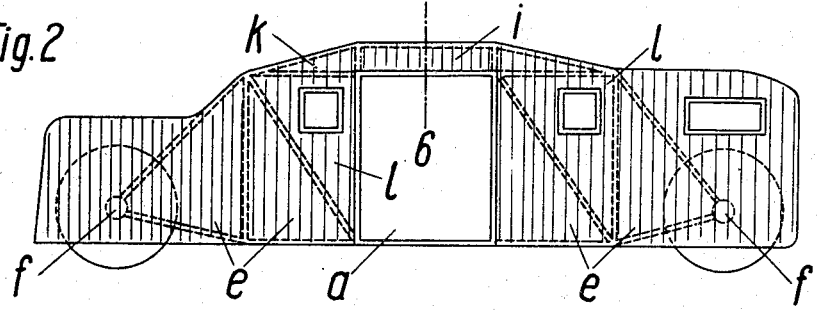
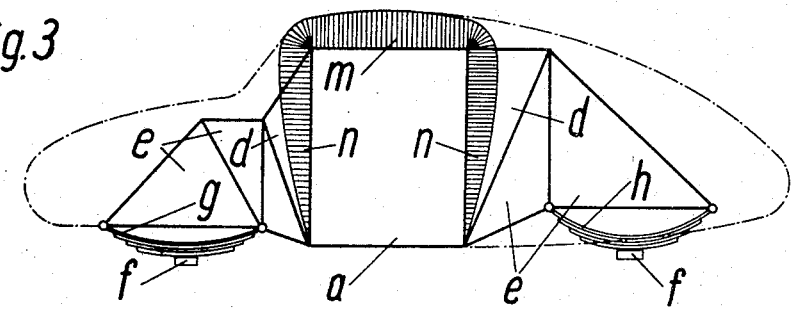
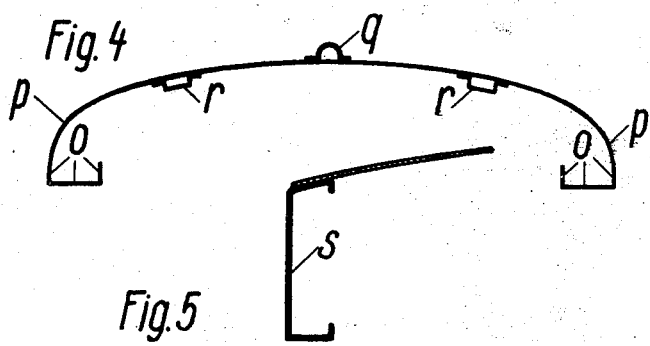
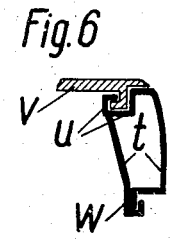
Inventor
Friedrich E. Maier,
By Sommer & Young
Attys Feb. 27, 1940.　　　F. E. MAIER　　　2,191,572
CAR BODY
Filed Oct. 21, 1936　　　2 Sheets-Sheet 2

Inventor
Friedrich Eugen Maier
by Sommers + Young
Attys.

Patented Feb. 27, 1940

2,191,572

UNITED STATES PATENT OFFICE 2,191,572

CAR BODY

Friedrich Eugen Maier, Berlin-Charlottenburg, Germany

Application October 21, 1936, Serial No. 106,918
In Germany October 23, 1935

4 Claims. (Cl. 296—28)

The present invention relates to vehicle bodies and more particularly to self-supporting bodies for motor vehicles.

In self-supporting vehicle bodies the disposition and design of members intended for bridging the door and window openings or loading openings involves various difficulties the avoidance of which creates a problem to the designer. The solution of this problem has previously been hindered by the fact that hitherto the vertical forces at these places were taken up by floor or chassis girders. This general arrangement has been so customary that bodies were previously termed "self-supporting" when the structural members serving for carrying the outside shell were more or less directly connected to an underframe which carried the vertical forces or at least a large part thereof.

It is an object of the present invention to avoid such statically indefinite constructions and it is a further object of the invention to provide a vehicle body in which the horizontal and vertical forces are distributed from the axles over the whole spacial system as such, the system being made self-supporting in itself. This, in itself, is quite possible and practical and as long as such a self-supporting spacial system does not include window, door and other service openings, no great difficulties arise. Moreover, a number of suggestions have already been made according to which large service openings should be bridged by constructing the said openings with stiff frames, or use was to be made of struts and chords intended for leading the forces as before beneath and around the openings about in the same way as in the case of underframes or chasses. Solution of this character also include the suggestion that two specially stiffened systems should be so designed that their bracing leaves a square service opening. The practical realization of these suggestions however shows that a certain restriction as to the construction of self-supporting car bodies of this description cannot be avoided.

It is a feature of the present invention that this restriction is overcome by the provision of an arched girder resistant to flexure disposed above the door, window and other large service openings. Such a girder in the spacial system connects the several structural members to one another and at the same time takes up the vertical forces in the zone of the said openings. This flexure resisting arrangement requires that the flexure resisting girder be rigidly fixed at its ends. In connection with a self-supporting spacial system this requirement can be satisfied very readily and without the use of additional means. For example, the fixed portion of a cantilever girder may readily be incorporated in the panel adjacent the opening to be bridged. This fixed portion of the opening to be bridged represents a structural girder at the same time is required for that member which in any case is required for that panel. Similar considerations will hold true for flexure resisting girders fixed at either end and for portal girders forming for example, roof members of the body.

In the practical utilization of the inventive idea, it is the starting point that for the practical formation of the top and bottom chords of the novel flexure resisting girders only well known and readily obtainable sections of metal should be used, such as hollow profiles intended for housing cables, rodding or the like, or open profiles used for fastening the internal cover-ing of the passenger compartment, for guiding a sliding roof cover or the like, for the provision of tightening folded seams etc. In the case of closed vehicle bodies with permanently closed roofing the whole roof member may be used as an arched flexure resisting girder since in this instance the twisting stresses arising from the usually skew bending of the local flexure resisting girder will compensate one another. When flexure resisting girders are arranged uni-laterally at the edge of a roof having covered openings, the possible twist may be carried by an appropriately designed hollow profile of the flexure resisting girders.

The arrangement referred to is particularly adapted to impart stiffness to resist flexure and twist in a self-supporting vehicle body. Within the scope of this inventive idea the said flex-ure resisting girders are particularly suited for combining two spacial supporting systems into a unit which is resistive to twist. Other features of this invention will be obvious from the following description with reference to embodi-ments illustrated by the accompanying drawings in which—

Fig. 1 is a somewhat diagrammatic side view of a vehicle body the door opening of which is bridged by a cantilever girder.

Fig. 1a is a diagrammatic sectional view of part of the vehicle on the line 1a—1a of Fig. 1.

Fig. 2 is a somewhat diagrammatic side view of a vehicle body having a flexure resisting girder extending over the door opening and fixed at both ends.

Fig. 3 is a diagrammatic side view of a vehicle body having a portal girder which encloses the door opening at the top and sides.

Fig. 4 is a diagrammatic sectional view of a vehicle roof which is designed as an arched girder resistive to flexure.

Fig. 5 is a diagrammatic sectional view of a flexure resisting girder of a particularly simple, arched, deep-web type for use particularly for omnibuses.

Fig. 6 is a diagrammatic sectional view on the line 6—6 of Fig. 2 of a hollow profile flexure resisting, arched, girder for vehicles provided with a sliding roof cover.

Figure 7:
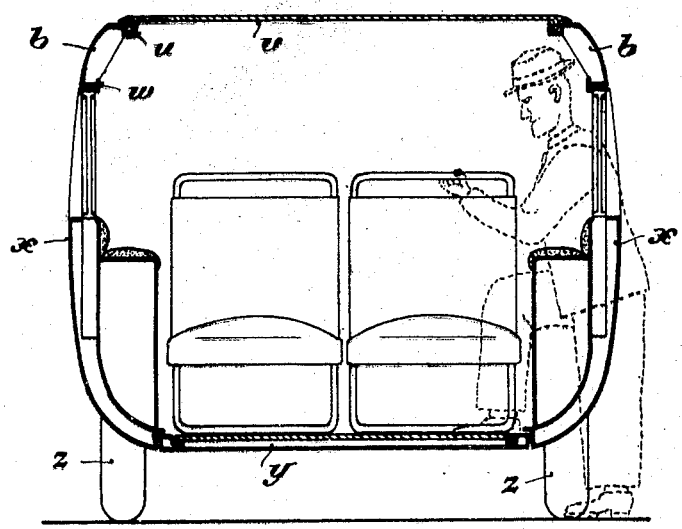
Fig. 7 is a diagrammatic sectional elevational view of a vehicle body the side walls and the floor of which are shaped in a special manner.

In the embodiment shown by Fig. 1 the door opening $a$ is bridged by the flexure resisting cantilever girder $b$. Over the distance $c$, this flexure resisting girder is fixed in the adjacent panel $d$ of the vehicle body. The other portions $e$ of the body in a triangular system compose the self-supporting vehicle body which rests on the axles $f$ of the vehicle wheels. An essential feature of this arrangement is that within the zone of the door opening the vertical forces from the whole statical system are taken up by the flexure resisting girder $b$ entirely or at least chiefly.

The flexure resisting girder fixed at both end portions in the adjacent panels $l$, as shown by Fig. 2, is intended particularly for large vehicles. Here the door opening $a$ is bridged by the girder $i$ the ends $k$ of which are fixed in the panels $l$. Also in this instance the vehicle body is supported on the axles $f$ by means of the remaining spacial system.

In the case of the flexure resisting portal girder according to Fig. 3 a door opening $a$ which is very wide in comparison with the total length of the vehicle body is taken as the basis of the construction. The portal type of girder will be advantageous in all instances where the width of the adjacent panels on either side of the door opening is rather small or where such panels are not available at all. With its two vertical end portions $n$ the portal girder $m$ is fixed in the spacial latticework $d$ of the vehicle body which is supported by means of its springs $g$, $h$ which rest on the axles $f$ of the vehicle wheels.

The cross section of the roof as shown in Fig. 4 represents a flexure resisting girder the bottom chords $o$ of which are obtained by the roof being bent inwardly in flange-like manner as shown. The upwardly extending curved lateral portions of the roof form the webs $p$ of the arched flexure resisting girder while the top chord thereof is constituted by the correspondingly shaped roof itself or, if necessary, by additional profiles $q$ and $r$. All these profiles $o$, $p$, $q$ and $r$ may readily be utilized for other useful purposes. Thus, for instance, the interior of the profile $q$ may be used for housing cables, the profiles $r$ for stiffening the particular surface and for housing other cables as well as for the fastening of the internal cover, as may also the profile $o$, which latter may moreover be constructed as the door header with a lintel against which the door is caused to tightly bear.

The cross section shown in Fig. 5 of a flexure resisting girder $s$ having a rather deep web may be used for girders fixed at either end and more particularly for flexure resisting girders having an increasing or decreasing depth. It is readily comprehensible how such a girder can be utilized for other practical purposes in the large vehicles to which it is preferably adapted, this girder being used as a side wall of the luggage compartment, a bearing member for cross stiffeners, a parcel shelf or the like, or the whole hollow space of the said girder being employed for housing roller curtains.

For application to roofs provided with sliding or roller covers, Fig. 6 shows a girder section comprising a hollow profile $t$. The double web thereof imparts to the profile sufficient resistance to twist. The top chord is chiefly formed by the guide rail $u$ of the roller cover $v$ while the bottom chord is obtained by suitably shaping and connecting the borders, as is obvious as at $w$.

The instances shown are, of course, not exhaustive. According to the shape and the equipment of the car the arrangement of the flexure resisting girder or girders shown may be modified in various ways. Preferably, the inventive idea described is intended for the improvement of self-supporting bodies of passenger automobiles, for which the question of preserving or even increasing the economy in weight is of essential importance. Nevertheless the application of the same constructional ideas is of value in the case of vans. In either type of vehicle the reduction of the passenger entry height or goods loading height will have a beneficial effect. This new effect results from the absence of any reinforcement of the struts disposed beneath the door or loading opening. In the case of passenger vehicles the objectionable formation of a sill above or about the girders hitherto disposed across the bottoms of the door or loading openings can be dispensed with.

This freedom as to the design of the bottom edge of the door permits of the floor of the vehicle body being made narrower over its whole length or at least in the zone of the door opening so that the bottom border thereof is, for the entrance into the passenger compartment, displaced towards the center line of the vehicle. On the other hand the possibility of hindrance to the entry of tall persons by the girder disposed above the door opening is reduced, inasmuch as the said girder is then in practice sufficiently in front of the plane of the door so that such a person will have his head behind the said girder when stepping in. Fig. 7 diagrammatically shows an embodiment of this arrangement. Above the doors $x$ there extend the flexure resisting girders $b$ which carry a roller cover $v$. The vehicle floor $y$ constructed, for example, as a double floor is so narrow that its side borders are behind the wheels $z$. Accordingly, the doors $x$ and also the other portions of the side walls are turned in considerably from the larger width of the passenger compartment in its upper and central part in such manner that with the aid of this curvature the car body has a closed streamlined shape which moreover has an advantageous influence on the reduction of the air resistance at the bottom of the car. The said figure also shows that the novel arrangement of the entrance facilitates access to the rear seats as on account of their width being adapted to the smaller width of the floor, the front seats leave more space for the passage to the rear. The free space left between the narrow seats and the inside of the doors can be utilized for placing small cabinets on the inside of the said doors and the tops of these cabinets may be used as arm rests for the persons occupying the said front seats.

What I claim as my invention, and desire to secure by Letters Patent, is—

1. Self-supporting body for motor vehicles, the walls of which carry the body forces, comprising side walls, one of which side walls has a door opening, said walls including an inverted U-shaped arched portal girder extending above and at both sides of said door opening, the side parts of the U-shaped girder forming door posts, so that said girder takes up all vertical thrust and compressive forces between the door posts and transmits said vertical and compressive forces to the portion of said girder above said opening, said body below said opening being free of vertically directed and compressive forces, and being disposed inwardly relative to the portion of said girder above said opening.

2. Self-supporting body for motor vehicles, the walls of which carry the body forces in connection with the roof, comprising side walls having openings, the walls of the vehicle being formed with hollow shapes comprising arched girders above the openings, the side walls being formed as vertically extending posts adjacent said openings joined to said girders and transmitting all vertical thrust and compressive forces between the door and window posts to the arched girders, the body beneath said openings being free of vertically directed and compressive forces.

3. Self-supporting body for motor vehicles, the walls of which carry the body forces in connection with the roof, comprising side walls having openings formed therein, a metal roof cover having lateral downwardly curved webs forming arched girders over the openings, the side walls forming vertically extending posts adjacent said openings joined to said girders and transmitting vertical thrust and compressive forces from between the door and window posts to said arched girders, whereby the body beneath said openings is free of vertically directed and compressive forces.

4. Self-supporting body for motor vehicles, the walls of which carry the body forces in connection with the roof, comprising side walls having openings formed therein, a metal roof cover having lateral margins comprising arched girders above the openings and having upper binding members and reinforcement, the vehicle side walls being formed as vertically extending posts adjacent said openings joined to said supports and transmitting all vertical thrust and compressive forces between the posts to the arched girders, whereby the body beneath said openings is substantially free of vertically directed and compressive forces.

FRIEDRICH EUGEN MAIER.

CERTIFICATE OF CORRECTION.

Patent No. 2,191,572. February 27, 1940.

FRIEDRICH EUGEN MAIER.

It is hereby certified that error appears in the printed specification of the above numbered patent requiring correction as follows: Page 3, first column, line 10, claim 1, strike out the words "and compressive"; and that the said Letters Patent should be read with this correction therein that the same may conform to the record of the case in the Patent Office.

Signed and sealed this 22nd day of October, A. D. 1940.

(Seal)

Henry Van Arsdale,
Acting Commissioner of Patents.